United States Patent
Shi et al.

(10) Patent No.: US 12,287,538 B2
(45) Date of Patent: Apr. 29, 2025

(54) OPTICAL HYBRID-WAVEGUIDE ELECTRO-OPTICAL MODULATOR

(71) Applicant: Nokia Solutions and Networks Oy, Espoo (FI)

(72) Inventors: Ruizhi Shi, Quincy, MA (US); Ari Novack, Seattle, WA (US); Alexander Rylyakov, Staten Island, NY (US); Eu-Jin Andy Lim, Singapore (SG)

(73) Assignee: Nokia Solutions and Networks Oy, Espoo (FI)

( * ) Notice: Subject to any disclaimer, the term of this patent is extended or adjusted under 35 U.S.C. 154(b) by 244 days.

(21) Appl. No.: 17/820,673

(22) Filed: Aug. 18, 2022

(65) Prior Publication Data
US 2023/0055077 A1 Feb. 23, 2023

(30) Foreign Application Priority Data
Aug. 19, 2021 (EP) .................... 21192038

(51) Int. Cl.
*G02F 1/035* (2006.01)
*G02B 6/12* (2006.01)
*G02F 1/21* (2006.01)

(52) U.S. Cl.
CPC ......... *G02F 1/035* (2013.01); *G02B 6/12004* (2013.01); *G02F 1/212* (2021.01); *G02B 2006/12061* (2013.01); *G02B 2006/12097* (2013.01); *G02B 2006/12142* (2013.01)

(58) Field of Classification Search
CPC ...... G02F 1/035; G02F 1/0353; G02F 1/0356; G02F 1/212; G02B 6/12004
See application file for complete search history.

(56) References Cited

U.S. PATENT DOCUMENTS

| | | | | |
|---|---|---|---|---|
| 9,989,830 | B2* | 6/2018 | Horiguchi | G02F 1/225 |
| 10,078,253 | B2* | 9/2018 | Hosokawa | G02F 1/035 |
| 10,788,689 | B1* | 9/2020 | Lentine | G02F 1/0356 |
| 11,204,535 | B2* | 12/2021 | Zou | G02F 1/035 |
| 11,287,720 | B2* | 3/2022 | Hayashi | G02F 1/2255 |
| 2015/0293427 | A1 | 10/2015 | Goi et al. | |
| 2020/0225556 | A1 | 7/2020 | Hayashi et al. | |

(Continued)

OTHER PUBLICATIONS

Wang, C., Zhang, M., Chen, X. et al. Integrated lithium niobate electro-optic modulators operating at CMOS-compatible voltages. Nature 562, 101-104 (2018). https://doi.org/10.1038/s41586-018-0551-y.

(Continued)

*Primary Examiner* — Rhonda S Peace
(74) *Attorney, Agent, or Firm* — Stratford Group Ltd.

(57) ABSTRACT

An apparatus includes a lithium niobate (LN) layer, and a planar electro-optical modulator having at least one hybrid optical core segment formed of a portion of the LN layer and an optical guiding rib. The optical guiding rib may be located in a top silicon layer of a silicon photonics (SiP) chip, to which a thin-film LN chip is flip-chip mounted, and may be coupled to optical waveguide cores in a first silicon core layer of the SiP chip. One or more drive electrodes are disposed between a substrate of the SiP chip and the LN layer. In some embodiments hybrid optical core segments may include silicon nitride core segments and may form an MZM configured to be differentially or dual-differentially driven.

11 Claims, 9 Drawing Sheets

(56) References Cited

U.S. PATENT DOCUMENTS

2020/0363693 A1* 11/2020 Zou .................. G02F 1/015
2021/0135906 A1* 5/2021 Gao .................. H04B 10/505
2023/0055077 A1* 2/2023 Shi .................... G02F 1/212

OTHER PUBLICATIONS

Peter O. Weigel, et al, "Bonded thin film lithium niobate modulator on a silicon photonics platform exceeding 100 GHz 3-dB electrical modulation bandwidth", vol. 26, No. 18 | Sep. 3, 2018 | Optics Express 23728.
Nicholas Boynton, et al. , "A heterogeneously integrated silicon photonic/lithium niobate travelling wave electro-optic modulator", vol. 28, No. 2 / Jan. 20, 2020 / Optics Express 1868.
EP Application 21192038.4 Office Action dated Aug. 9, 2024 "Optical Hybrid-Waveguide Electro-Optical Modulator" Shi Ruizhi et al.

* cited by examiner

OPTICAL HYBRID-WAVEGUIDE ELECTRO-OPTICAL MODULATOR

CROSS REFERENCE TO RELATED APPLICATIONS

This application claims priority to European Patent Office application Number EP EP21192038.4, "OPTICAL HYBRID-WAVEGUIDE ELECTRO-OPTICAL MODULATOR", filed by NOKIA SOLUTIONS AND NETWORKS OY on Aug. 19, 2021, and listing inventors Ruizhi Shi, Ari Novack, Alexander Rylyakov, and Eu-Jin Andy Lim.

TECHNICAL FIELD

The present invention generally relates to electro-optical modulators, and more particularly relates to an electro-optical modulator with optical waveguides including lithium niobate.

BACKGROUND

Broad-band optical communications typically require high-speed electro-optical modulators (EOM) to modulate light at a desired data rate. One common type of a broad-band EOM is a Mach-Zehnder modulator (MZM) having RF-driven electro-optical phase modulators in each waveguide arm. The waveguide arms of the MZM are typically formed in a suitable semiconductor or other electro-optic material such as $LiNbO_3$, so that light propagation in the waveguide arms may be controlled by applying a voltage. Such a waveguide electro-optic modulator may be implemented in an opto-electronic chip as a photonic integrated circuit (PIC).

Silicon Photonics (SiP) has been used as a platform to build high speed electro-optic modulators and transceivers for 100 Giga-bit/second (Gbs), 200 Gbs, 400 Gbs applications. Silicon (Si) has a relatively high refractive index compared to silicon dioxide (SiO2), so Si waveguide cores in a SiO2 cladding may be small, e.g. having a width of about 500 nm. Advantageously, SiP can utilize mature CMOS processes to fabricate highly integrated optical circuits on a silicon substrate, allowing SiP chips to be mass produced at relatively low cost. Traditional high speed silicon electro-optic modulators are based on carrier depletion plasma dispersion effect, using PN junctions formed in Si waveguide cores, which in operation are typically reverse biased. However, high-speed performance of silicon electro-optic modulators may be affected a relatively high junction capacitance and free carrier absorption in the waveguide. The junction capacitance may limit the bandwidth that the electro-optic modulator can achieve. Free carrier absorption adds insertion loss.

In bulk Lithium Niobate (LiNbO3, "LN"), optical waveguides are traditionally formed using diffusion or proton-exchange methods, which result in a large mode profile and low modulation efficiency. TFLN waveguides may be formed by etching TFLN. The refractive index of LN at typical telecommunication wavelengths is about 2.1, which is significantly higher than $SiO_2$'s index 1.45, therefore single mode TFLN waveguide can be relatively small, e.g. with the width typically in the 1 to 4 µm, allowing for a relatively small distance between the electrodes and hence a stronger electrical field in the waveguide for a given voltage, produce high modulation efficiency and low insertion loss compared to SiP PN junction electro-optic modulators.

SUMMARY

Embodiments described herein relate to photonic integrated circuits utilizing hybrid TFLN waveguide(s) in an optical modulation. For such an electro-optic modulator the bandwidth is not expected to be limited by junction capacitance as in SiP junction-type electro-optic modulators.

A first embodiment provides an apparatus comprising a silicon substrate, a lithium niobate (LN) layer and a planar Mach-Zehnder electro-optic modulator (MZM) extending along a main surface of the substrate, the planar MZM comprising two optical waveguide arms connected to receive light in parallel from an optical splitter, and at least two traveling wave (TW) drive electrodes. Each of the two optical waveguide arms comprises a hybrid optical core segment located adjacent at least a corresponding one of the at least two TW drive electrodes, each of the hybrid optical waveguide core segments comprising a portion of the LN layer and an optical guiding rib located adjacent to and along the portion of the LN layer, each optical guiding rib being integral with the silicon substrate and comprising silicon therein.

In some implementations, the apparatus of the first embodiment may comprise an electrical driver connected to provide at least one drive signal to the at least two TW drive electrodes such that the two optical waveguide arms are driven in a push-pull manner.

In some implementations the electrical driver may have differential outputs connected to the at least two TW drive electrodes.

In any of the above implementations, the at least two TW drive electrodes may comprise two pairs of TW drive electrodes, each pair disposed to modulate light in a corresponding one of the two optical waveguide arms.

In some of the above implementations wherein the at least two traveling wave drive electrodes comprise two pairs of TW drive electrodes, each pair disposed to modulate light in a respective one of the two optical waveguide arms, the electrical driver may have two pairs of differential outputs electrically connected to the two pairs of TW drive electrodes.

In any of the above implementations, the LN layer may extend over the at least two TW electrodes.

In any one of the above implementations, each rib, or at least one of the ribs, may be silicon rib or a silicon nitride rib.

In any one of the above implementations, the at least two TW drive electrodes may be between the LN layer and the substrate.

In any of the above implementations, the apparatus of the first embodiment may comprise one or more planar optical waveguide cores extending along the main surface of the substrate at a different distance therefrom than the ribs, and may further comprise at least one vertical coupler for optically coupling the one or more planar optical waveguide cores and the ribs, when in different layers of the substrate, e.g., located at different vertical levels of a silicon-photonics chip. Some of such implementations may comprise one or more optical devices disposed in a layer between the substrate and the ribs. Some of such implementations may comprise one or more optical devices disposed in a layer between the substrate and the ribs. Any of such implementations may comprise a plurality of vertically stacked silicon layers disposed between the substrate and the LN layer.

Any one of the above implementations may comprise a silicon nitride layer disposed between two silicon layers.

A second embodiment described herein relates to an apparatus comprising a silicon substrate and a planar electro-optical modulator, the planar electro-optical modulator being over the substrate and fixed thereto. The planar electro-optical modulator includes a hybrid planar optical waveguide core and drive electrodes, the hybrid planar optical waveguide core comprising a portion of a lithium niobate (LN) layer and a first optical guiding core segment extending along the portion of the LN layer adjacent thereto, the first optical guiding core segment being a silicon core segment. The drive electrodes comprise a first pair of drive electrodes extending along the first optical guiding core segment, the first pair of electrodes being between the LN layer and the substrate, the first pair of the drive electrodes being located to enable modulation of a refractive index of the portion of the LN layer.

In some implementations of the second embodiment, the planar electro-optical modulator includes another hybrid planar optical waveguide core and a second pair of drive electrodes, the another hybrid planar optical waveguide core comprising another portion of the LN layer and another first optical guiding core segment located between the substrate and the LN layer extending along and adjacent to the another portion of the LN layer, the another first optical guiding core segment being between the second pair of drive electrodes located to enable modulation of a refractive index of the another portion of the LN layer adjacent the another first optical guiding core segment. In some of such implementations, the electro-optical modulator further comprises an optical splitter, the hybrid planar optical waveguide cores being configured to receive light in parallel from the optical splitter.

Some implementations of the second embodiment comprise a silicon photonics (SiP) chip, the SiP chip comprising a substrate, the first optical guiding core segment or segments, and a planar optical waveguide, the planar optical waveguide and the first optical guiding core segments being in different layers of the SiP chip, further comprising at least one optical coupler, e.g., a vertical and/or evanescent optical coupler, for optically coupling the planar optical waveguide to the first optical guiding core segments. In some of such implementations, the optical splitter and the first optical guiding core segments are in a same layer of the SiP chip. In some of such implementations, the optical splitter and the first optical guiding core segments are in different layers of the SiP chip. In any of these implementations, the SiP chip may include one or more optical devices, such as but not limited to input/output ports, photodetectors (PD), optical splitters, optical combiners, optical filters, optical gratings, optical polarizers, optical polarization splitters or and/or combiners, optical polarization converters, optical phase shifters, variable optical attenuators, and the like. In some of such implementations, the one or more optical devices may be disposed in an optical device layer of the SiP chip comprising the planar optical waveguide. In some of such implementations, the optical device layer may be a first silicon layer of the SiP chip which may be disposed directly over an oxide layer. In some implementations, the SiP chip may be a silicon-on-insulator (SOI) chip.

BRIEF DESCRIPTION OF THE DRAWINGS

Embodiments disclosed herein will be described in greater detail with reference to the accompanying drawings which represent preferred embodiments thereof, in which like elements are indicated with like reference numerals, and wherein.

DETAILED DESCRIPTION

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits may be omitted so as not to obscure the description of the present invention. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Furthermore, the following abbreviations and acronyms may be used in the present document:

"CMOS" Complementary Metal-Oxide-Semiconductor

"Si" Silicon
"SiO₂" Silicon Dioxide
"LiNbO₃" Lithium Niobate
"PIC" Photonic Integrated Circuit
"SOI" Silicon on Insulator
"SiP" Silicon Photonics
"RF" Radio Frequency
"DC" Direct Current
"AC" Alternate Current
"TW" Travelling Wave
"CMP" Chemical Mechanical Polishing Note that as used herein, the terms "first", "second" and so forth are not intended to imply sequential ordering, but rather are intended to distinguish one element from another, unless explicitly stated. Similarly, sequential ordering of method steps does not imply a requirement of sequential order of their execution, unless explicitly stated. The term "connected" may encompass direct connections or indirect connections through intermediate elements, unless explicitly stated otherwise. The term "electrically connected" and its derivatives encompasses both DC and AC connections, unless explicitly stated otherwise. The term "differential signal" refers to a signal that is transmitted using two single-ended signals having about complementary AC components. The term "inverted differential signal" refers to a differential signal having AC components of its constituent single-ended signals inverted relative to those of a reference differential signal, or refers to a differential signal having high-low and low-high transitions switched. The term "substrate" encompasses single and multi-layer structures that are roughly or substantially planar. The term "vertical" refers to a direction generally perpendicular to a main surface of the substrate along which relevant integrated circuitry is disposed.

A traveling wave (TW) electrode supports propagation of an RF operating signal there along.

Typical TW electrodes usually are longer than about $1/10^{th}$ of a smallest operating wavelength for an RF signal propagating along the electrode. TW electrodes are often electrically terminated to, at least, partially suppress back reflections of the RF signal at their ends, or even to totally suppress such back reflections. For example, such an electrical termination may be an approximately matched electrical connection to a chip ground or a DC source.

The present disclosure describes examples of electro-optic modulators (EOMs) with hybrid waveguide cores incorporating TFLN and silicon-based or silicon-nitride-based optical guiding sub-cores, e.g. in the form of silicon and silicon nitride segments or ribs that "load" the TFLN to confine an optical mode of the hybrid waveguide in the direction lateral to light propagation along the layer of TFLN, and methods of driving such EOMs.

Figure 1A:
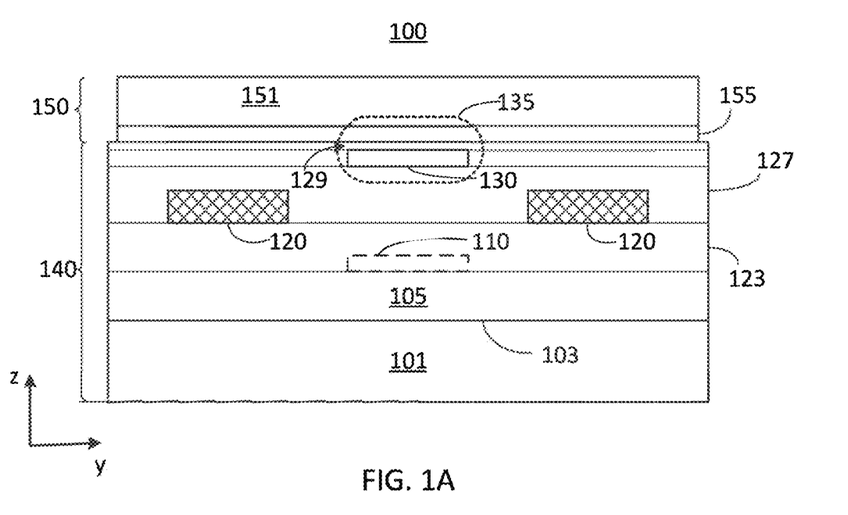
FIG. 1A is a schematic vertical cross-sectional view of a portion of an electro-optic modulator having a thin-film Lithium Niobate (TFLN) chip bonded to a SiP chip, to form a hybrid TFLN-on-silicon (TFLN-Si) electro-optic modulator waveguide segment coupled to an input waveguide and a pair of drive electrodes.
Figure 1B:
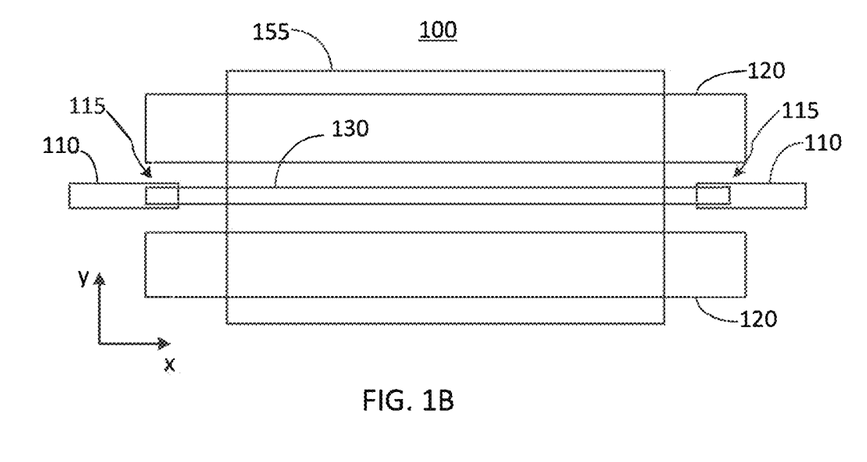
FIG. 1B is schematic plan view of the portion of an electro-optic modulator shown in FIG. 1A.

FIGS. 1A and 1B schematically illustrate, in cross-sectional and plan views, respectively, an example EOM 100 that includes planar electro-optical phase modulators fixedly disposed over a substrate 101. The planar electro-optical phase modulator includes drive electrodes 120, at least one optical guiding core segment 130, and a lithium niobate (LN) layer 155. The LN layer 155 has a portion extending adjacent to, and along, e.g., parallel to, the optical guiding core segment 130, e.g. at least partially directly over said segment, so as to form therewith a hybrid planar optical waveguide core 135 ("hybrid core 135"). In the surrounding media, the hybrid core 135 thus includes the optical guiding core segment 130 and the portion of the LN layer adjacent and approximately parallel thereto, and is capable of supporting and laterally confining an optical mode in an operating wavelength range of the EOM, with the optical power of the mode partly confined in the LN layer 155 and partly—in the optical guiding core segment 130. The operating wavelength range may be a wavelength range reserved for optical communications, e.g. at around 1.5 microns, or at around 1.3 microns, by way of example, conventional optical O, S, C, and/or L band(s). The optical guiding core segment 130 may be integral with the substrate 101, extending along a main surface 103 thereof, e.g., at a smaller distance from the main surface 103 than the LN layer 155. FIG. 1A illustrates a partial cross-section of the EOM 100 by a plain normal to the main face 103 of substrate 101 across the optical guiding core segment 130, while FIG. 1B illustrates a portion of the EOM 100 in a plan view.

The pair of drive electrodes 120 extend along the first optical guiding core segment 130 (FIG. 1B) suitably close thereto and the LN layer 155, so as to enable electro-optical modulation of a refractive index of the portion of the LN layer 155 that is adjacent and parallel to, i.e. directly over or under, the first optical guiding core segment 130. In a vertical direction, i.e. the direction perpendicular to the main surface 103 of the substrate 101, the drive electrodes 120 are positioned between the LN layer 155 and the substrate 101 (FIG. 1A), i.e. at a smaller distance from the substrate 101 than the LN layer 155. The optical guiding core segment 130 may be a silicon or silicon nitride core segment, shaped e.g. as a rib or stripe. In one embodiment the optical guiding core segment 130 may be of crystalline silicon. In another embodiment the optical guiding core segment 130 may be of amorphous silicon or polycrystalline silicon.

In an example embodiment the optical guiding core segment 130 and the pair of drive electrodes 120 are formed in a SiP chip 140 using conventional CMOS processes. A TFLN chip 150, having the LN layer 155 at the top, may then be flip-chip bonded to the SiP chip 140, with the LN layer 155 directly facing the optical guiding core segment 130. The bonding may be done with a conventional wafer-scale process. In the SiP chip 140, a thin top layer 129 of a suitable optical material, e.g. SiO₂, may be formed over the optical guiding core segment 130. The top layer 129 may be thin enough to allow for evanescent optical coupling between the optical guiding core segment 130 and the LN layer 155. The LN layer 155 and/or top surface of the SiP chip 140 may be planarized prior to the bonding, e.g. by chemical mechanical polishing (CMP).

The SiP chip 140 may be a chip of a SOI wafer, and may have a buried silicon dioxide (BOX) layer 105 formed on a Si substrate 101, and a first layer of crystalline or polycrystalline silicon disposed directly over the BOX layer 105. In one embodiment the optical guiding core segment 130 may be formed in a first silicon layer disposed directly over the BOX layer 105. In the example embodiment illustrated in FIGS. 1A and 1B, the optical guiding core segment 130 is formed in a second layer of silicon separated from the first layer by another optical material having a lower refractive index than silicon, at the relevant optical operating wavelengths. In some embodiments there may be more layers disposed between the BOX layer and the layer of the silicon or silicon-nitride optical guiding core segment 130. The first layer of crystalline or polycrystalline silicon, or one of the silicon layers between the BOX layer and the layer of the optical guiding core segment 130, may be patterned to form another rib waveguide core 110, with a layer 123 of e.g. silicon dioxide deposited thereover to form a cladding. The rib waveguide cores 110 may be, e.g., silicon waveguides of a silicon device layer of the SiP chip 140. Such a silicon device layer may be convenient to locate farther from the surface of the SiP chip 140 to provide for isolating optical cladding thereover. The pair of drive electrodes 120 may then be formed over the cladding layer 123, e.g. using conventional CMOS processes. Copper, aluminum, or other suitable metals or metal alloys may be used for the drive electrodes 120. A second cladding layer 127, e.g. another layer of $SiO_2$, may be deposited over the metal drive electrodes 120. The silicon or silicon nitride optical guiding core segment 130 may be formed upon the second cladding layer 127 so that at least a part of the silicon or silicon nitride optical guiding core segment 130 is positioned directly over at least a part of the rib waveguide core 110, and is aligned therewith to allow for vertical optical coupling between the optical guiding core segment 130 and the rib waveguide core 110. At an input end of the electro-optic modulator, e.g. left side in FIG. 1B, input light may be injected first into the rib waveguide core 110, from where the light is vertically evanescently coupled into the optical guiding core segment 130 by a vertical optical coupler 115. At the output end of the electro-optic modulator, e.g. at the right side of FIG. 1B, light from the optical guiding core segment 130 may be coupled into another rib waveguide core 110 using another vertical evanescent optical coupler 115. In other embodiments, one or more optical waveguides formed in the same layer as the optical guiding core segment 130 may be used to guide the modulated light out of the electro-optic modulator, or guide the input light into the electro-optic modulator.

By way of non-limiting example, the distance between the core layers, where the cores 110 and 130 are formed may be less than a micron to enable evanescent coupling there between, e.g. between about 200 and 900 nanometers (nm). The thickness of the top cover layer 127 may be e.g. 100 nm. The thickness of the cores 110 and 130 may be e.g. about 100-300 nm. The thickness of the LN layer 155 may be for example about 400 to 800 nm, e.g. about 600 nm.

Figure 2:
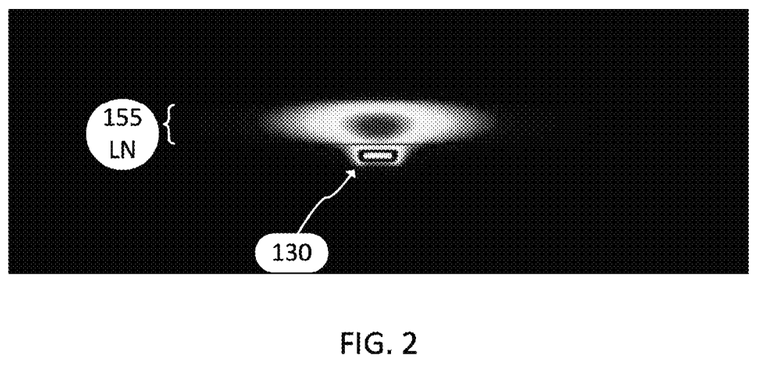
FIG. 2 is a diagram showing an estimated distribution of optical power in a cross-section of a hybrid TFLN-Si optical waveguide during operation.

The optical guiding core segment 130, the top layer 129, and the LN layer 155 may be dimensioned and relatively located so as to form a hybrid planar optical waveguide core supporting a guided mode, e.g., in which a large part or even the majority of optical power may be confined in the LN layer 155, i.e., in a portion thereof adjacent to the optical guiding core segment 130. For example, the center of the guided optical mode may be in the LN layer 155. FIG. 2 illustrates an example of the optical mode in such a hybrid waveguide formed by a 600 nm think LN layer 155 (refractive index $n_{LN}=2.2$) is separated by about 100 nm of $SiO_2$ ($n_{ox}=1.44$) from the planar optical waveguide core 130 in the form of a 400 nm×100 nm rib of crystalline silicon ($n_{Si}=3.48$). With the majority of the power of the optical mode or the center of the optical mode in the LN layer 155, the mode's propagation velocity in the hybrid optical waveguide 135 may be effectively modulated by applying a modulating voltage to the drive electrodes 120.

Figure 3A:
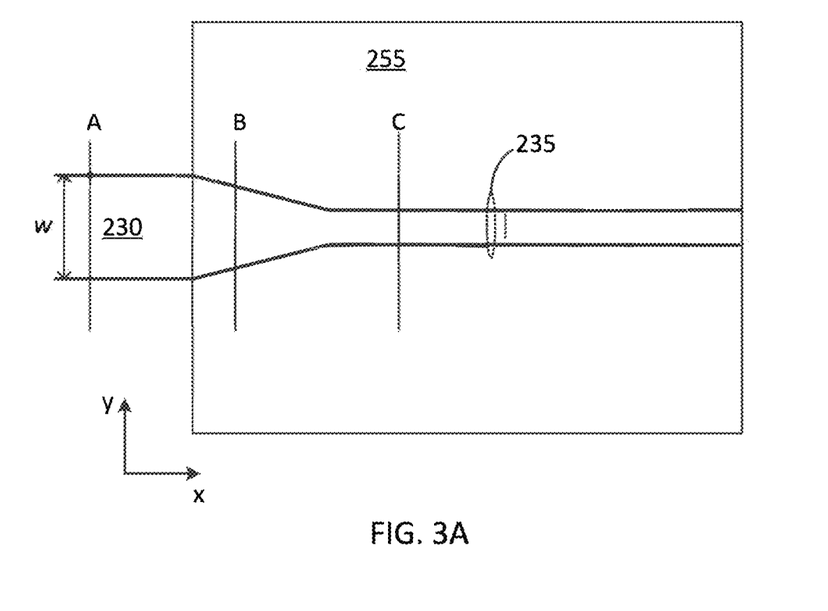
FIG. 3A is a schematic plan view of an optical coupler for coupling light into the TFLN layer of a hybrid TFLN-Si waveguide.
Figure 3B:
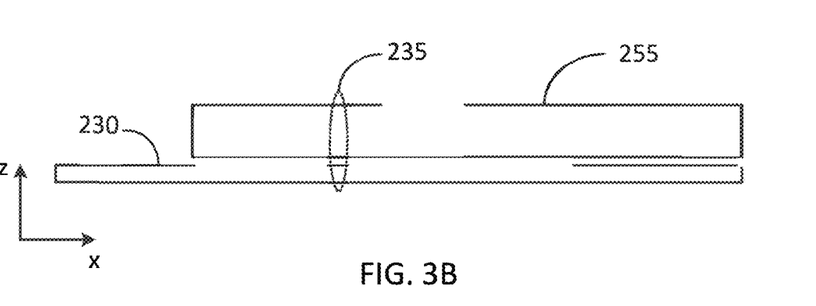
FIG. 3B is a schematic cross-sectional view of the optical coupler of FIG. 2A.

FIGS. 3A and 3B schematically illustrate, in a plan view and longitudinal cross-sectional view, along the propagation direction, respectively, an input portion of an example planar hybrid optical waveguide core 235 ("hybrid core 235") comprising a silicon guiding core segment 230 and a portion of an LN layer 255 adjacent thereto. The silicon guiding core segment 230 and the LN layer 255 may be embodiments of the optical guiding core segment 130 and an LN layer 155 illustrated in FIGS. 1A and 1B, and the hybrid core 235 may be an embodiment of the hybrid core 135. The silicon guiding core segment 230 may be tapered at the input into the hybrid core 235 to facilitate optical coupling from the silicon guiding core segment 230 into the LN layer 255. The coupling of light between the silicon guiding core segment 230 and the LN layer 255 may be facilitated by a relatively higher refractive index of silicon (e.g. ~3.48) than that of the LN layer (e.g. ~2.2). The greater refractive index of the silicon portion of the hybrid core 235 allows the LN layer 255 to be relatively thick, e.g. in the 500 nm to 700 nm range, where most of the optical power of, or the center of, the optical mode guided by the hybrid core 235 may be confined, as illustrated in FIG. 2. Embodiments where the guiding core segment 230 has a lower refraction index than the LN layer 255 may require a thinner LN layer, with a correspondingly lower optical confinement factor in the LN layer.

By way of example, the width w of the silicon guiding core segment 230 may be reduced from about 1000 nm at an input location, e.g. as indicated by cross-section "A", to about 400 nm under the LN layer 255, at about 100 microns away from the input, e.g. as indicated by cross-section "C", where most of the light power may be coupled into the LN layer 255, e.g., with a corresponding vertical shift of the center of the optical mode into the LN layer 255. In a middle portion of the taper, e.g. as indicated at cross-section "B", the optical mode may be split in power about equally between the LN layer 155 and the silicon guiding core 230. The tapering may be reversed at an output end (not shown), where the width w of the silicon guiding core segment 230 may be gradually increased, e.g. to its input value, to allow for a low-loss light propagation in the silicon guiding core segment 230.

Figure 4:
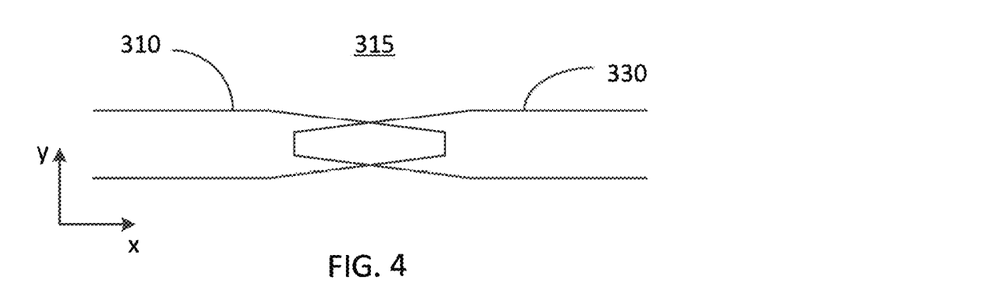
FIG. 4 is a schematic plan view of an optical coupler for launching light into a SiP sub-layer of a hybrid TLFN-Si waveguide.

FIG. 4 schematically illustrates an example vertical evanescent optical coupler 315 that may be used to couple light between optical waveguide cores 310 and 330 formed in different vertical layers of a SiP chip. Waveguide cores 310 and 330 may be embodiments of the optical waveguide cores 110 and 130 described above, and the vertical evanescent optical coupler 315 may be an embodiment of the vertical evanescent optical coupler 115 shown in FIG. 1B, or vertical evanescent optical couplers 515 described below. In this example, end portions of the optical waveguide cores 310 and 330 are disposed directly one over the other, and nearby, in the vertical direction to form the vertical evanescent coupler 315, and are both tapered down toward a middle portion of the coupler to facilitate the evanescent optical coupling between the waveguide cores.

Figure 5:
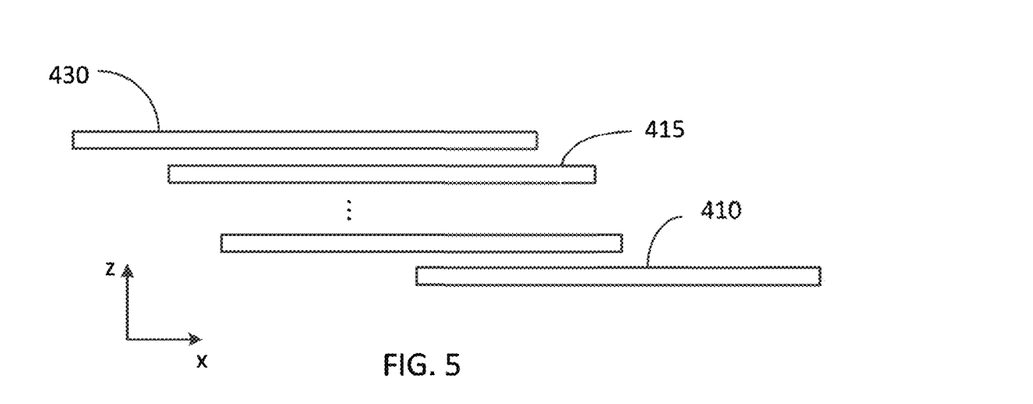
FIG. 5 is a schematic cross-sectional view of a vertical coupler for launching light into a SiP sub-layer of a hybrid TLFN-Si waveguide.

Referring to FIG. 5, in some embodiments one or more additional layers 415 may exist between an optical waveguide core segment 430, which forms a hybrid optical core with an LN layer (not shown), and a layer in which an input/output optical waveguide core 410, e.g., of a more deeply buried silicon optical device layer of a SiP chip, are formed. The optical waveguide core segment 430 may be an embodiment of the optical guiding core segments 130 or 330 described above, and the input/output optical waveguide core 410 may be an embodiment of the optical waveguide cores 110 or 310 described above. In the structure of FIG. 5, neighboring additional layers 415 are evanescently optically coupled and the lowest and highest additional layer(s) 415 are evanescently optically coupled to adjacent segments of the optical waveguide core 410 and the optical waveguide core segment 430, respectively.

Figure 6A:
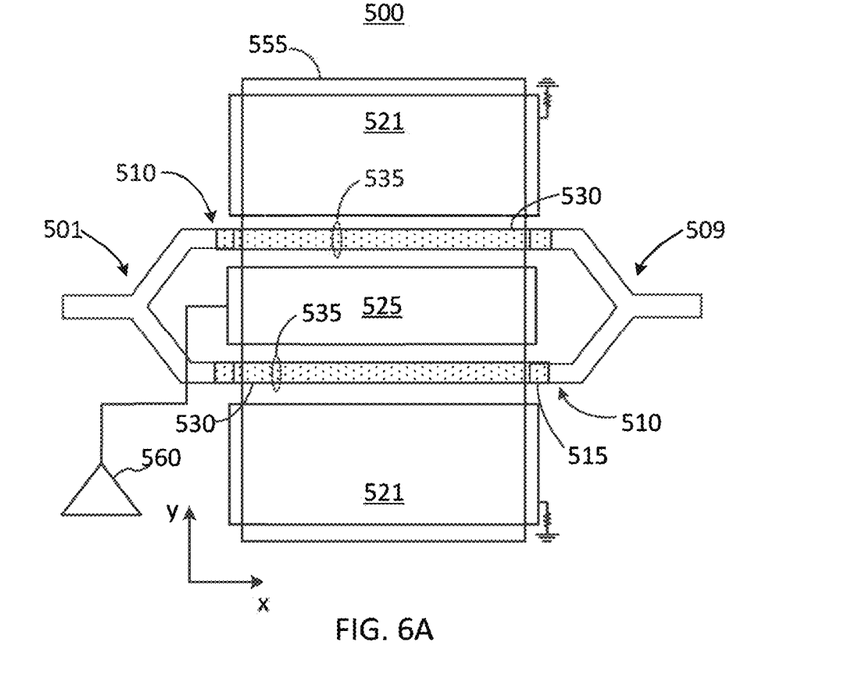
FIG. 6A is a schematic plan-view diagram of an electro-optic Mach-Zehnder modulator (MZM) with hybrid TLFN-Si waveguide arms, optical splitters/combiners in a first Si layer, and a ground-signal-ground (GSG) electrode layout.
Figure 6B:
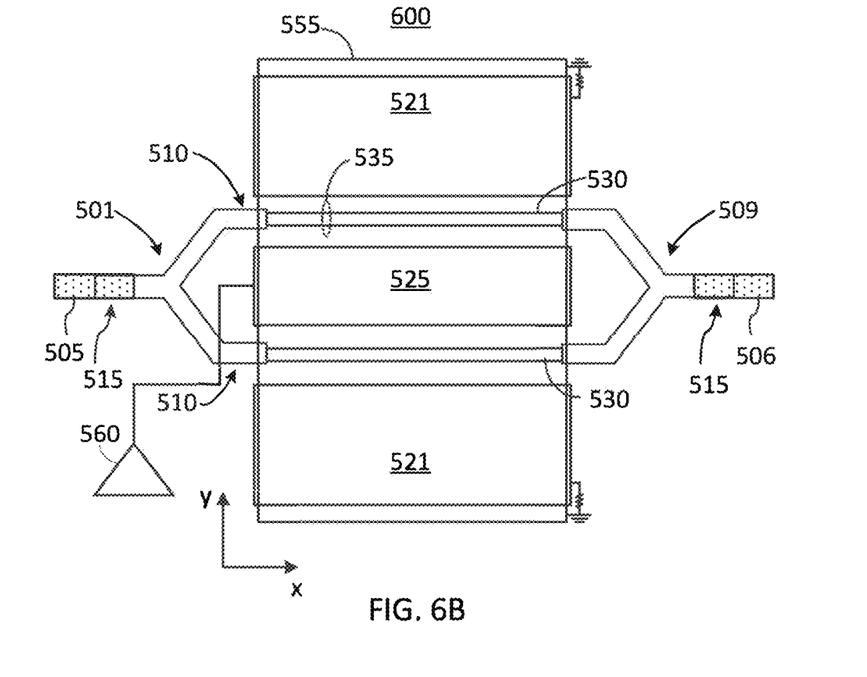
FIG. 6B is a schematic plan-view diagram of an electro-optic MZM with hybrid TLFN-Si waveguide arms and optical splitters/combiners in a second Si layer, and a ground-signal-ground (GSG) electrode layout.
Figure 7:
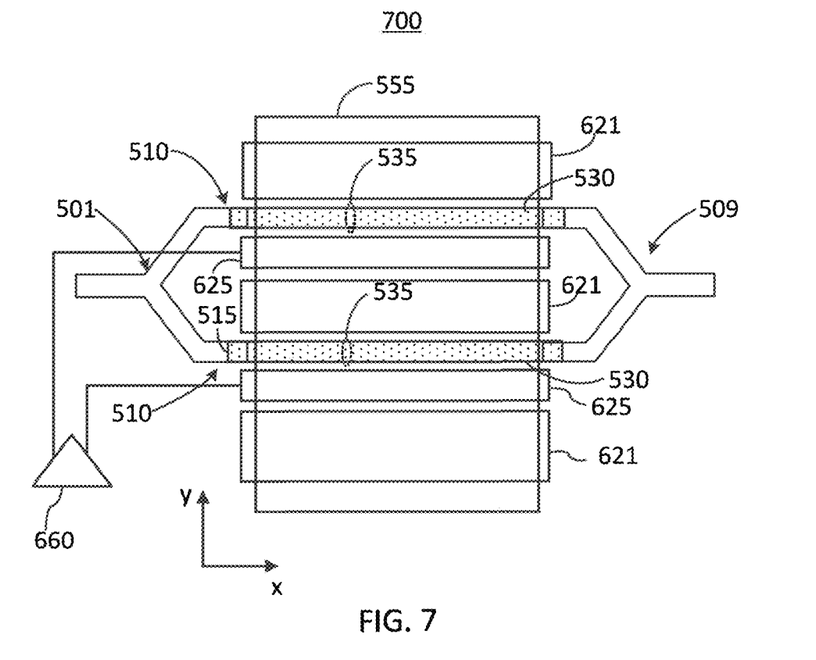
FIG. 7 is a schematic plan-view diagram of an electro-optic MZM with hybrid TLFN-Si waveguide arms and GSGSG electrode layout for differential modulator driving.
Figure 8:
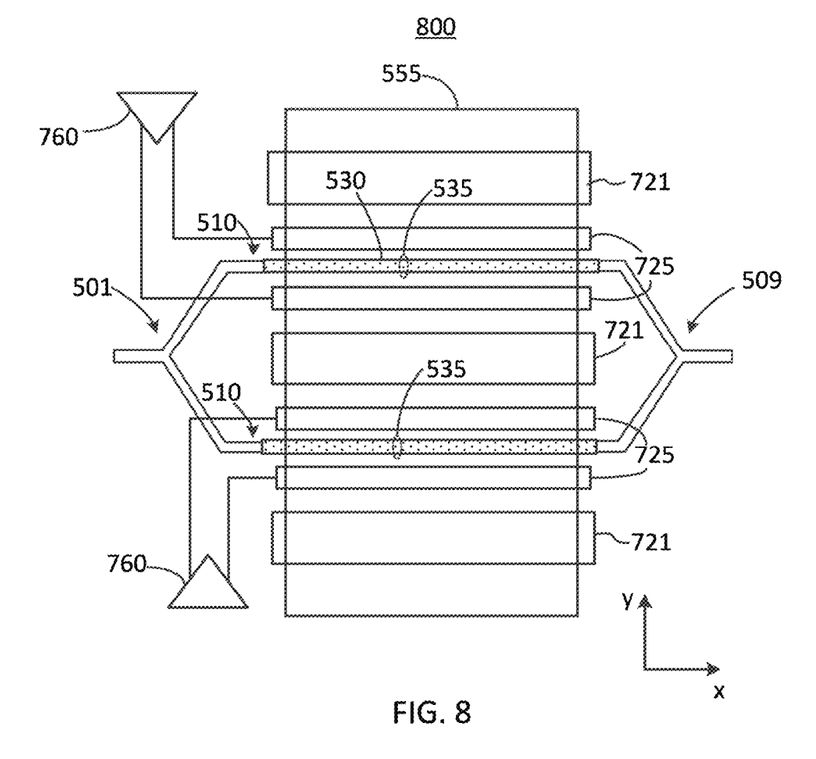
FIG. 8 is a schematic plan-view diagram of an electro-optic MZM with hybrid TLFN-Si waveguide arms and a GSSGSSG electrode layout for a dual-differential driver electro-optic modulator.

FIGS. 6A-8 illustrate embodiments of an EOM including a planar electro-optic Mach-Zehnder modulator (MZM) having a planar hybrid optical waveguide core, e.g. of the type described above, e.g., in FIGS. 1A, 1B, 2, 3, 4, and/or 5, in each optical waveguide arm thereof. In some embodiment the planar electro-optic MZM may be disposed over a silicon substrate. In the shown example embodiments, the electro-optic MZM includes two optical waveguide arms 510 connected to receive light in parallel from an optical splitter 501 and to transmit said light to an optical combiner 509, for recombination, after travelling along the modulator arms 510. The EOM also includes at least one traveling wave (TW) drive electrode 525 (FIGS. 6A, 6B), 625 (FIG. 7), or 725 (FIG. 8). Each of the two optical waveguide arms 510 includes a hybrid optical waveguide core segment 535 located adjacent a TW drive electrode and extending along thereto. Each of the hybrid optical waveguide core segments 535 includes a portion of a lithium niobate (LN) layer 555 and an optical guiding rib 530 locate adjacent to and along the LN layer 555. Each of the optical guiding ribs 530 may comprise silicon; e.g. in some embodiments each of the optical guiding ribs 530, or at least one of them, may be a silicon rib, i.e., a crystalline, polycrystalline, or amorphous silicon rib. In some embodiments, each of the optical guiding ribs 530, or at least one of them, may be a silicon nitride rib.

Each of the hybrid optical waveguide core segments 535 may be an embodiment of the hybrid optical waveguide core segment 135 described above with reference to FIGS. 1A and 1B, or variations thereof, with each optical guiding rib 530 being an embodiment of the optical guiding core segment 130 and being formed in a SiP chip such as SiP chip 140 described above with reference to FIG. 1A. Accordingly, FIG. 1A may represent a partial cross-section through either of the waveguide arms of the MZMs shown in FIGS. 6A-8 in some embodiments thereof. Although illustrated as Y-junctions, one or both of the optical splitter 501 and the optical combiner 509 may be embodied using other suitable optical couplers, including directional optical couplers and multimode interference (MMI) optical couplers. In some embodiments, the optical splitter 501 and the optical combiner 509 may be disposed in a same layer of the SiP chip with the optical guiding ribs 530. In some embodiments, at least one of the optical splitter 501 and the optical combiner 509 may be disposed in a different layer of the SiP chip than the optical guiding ribs 530, e.g., a lower silicon optical device layer, and coupled thereto with vertical optical couplers 515, e.g. as described above with reference to FIGS. 1A, 4, and 5. In some embodiments, vertical optical couplers 515 may be used to couple light from an input optical port of the SiP chip to an input waveguide of the optical splitter 501, and/or from an output of the optical combiner 509 to an output waveguide of the SiP chip. Vertical optical couplers 515 may be embodied, for example, as evanescent optical couplers as illustrated in FIG. 4 or 5, or alternatively may be formed using suitably configured optical diffraction gratings.

FIGS. 6A and 6B schematically illustrate an example layout of a planar electro-optic MZM having three drive electrodes arranged in a Ground-Signal-Ground (GSG) configuration, with two ground electrodes 521 extending along opposite sides of the hybrid optical waveguide core segments 535, and one TW drive electrode 525 between the hybrid optical cores 535. An electrical driver 560 is connected to provide a modulating drive signal to the TW drive electrode 525. Since the sign of a change in the refractive index of the LN layer 555 depends on the direction of the electric field therein, with this arrangement the hybrid optical cores 535 in the optical waveguide arms 510 are driven in a push-pull manner when a modulating drive signal V(t) is applied to the TW drive electrode 525.

FIG. 6A illustrates an embodiment, indicated as electro-optic MZM 500, where the input optical splitter 501 and the output optical combiner 509 are disposed in a different layer or layers of the SiP chip than the optical guiding ribs 530. In this embodiment, four vertical optical couplers 515, e.g., evanescent field optical couplers, are provided to couple respective outputs of the optical splitter 501 and inputs of the optical combiner 509 to opposite ends of the corresponding optical guiding ribs 530. FIG. 6B illustrates an embodiment, indicated as electro-optic MZM 600, where the input optical splitter 501 and the output optical combiner 509 are disposed in a same layer of the SiP chip with the optical guiding ribs 530. A vertical optical coupler 515, e.g., an evanescent field optical coupler, may be provided for optically coupling an input port of the optical splitter 501 with an input planar optical waveguide core 505 disposed in a different layer of the SiP chip. A second vertical optical coupler 515, e.g., an evanescent field optical coupler, may be provided for optically coupling an output of the optical combiner 509 with an output planar optical waveguide core 506. In some embodiments only one of the optical splitter 501 and the optical combiner 509 may be disposed in a different layer than the optical guiding ribs 530.

Referring now to FIG. 7, there is illustrated an example electro-optic MZM 700 having two TW drive electrodes 625, each extending alongside and adjacent to a corresponding one of the two hybrid optical waveguide core segments 535, with ground electrodes 621 located at the opposite side of the respective hybrid optical waveguide core segments 535. An electrical driver 660 is connected to provide a differential drive signal to the two TW drive electrodes 625, so that the two TW drive electrodes 625 receive about complementary modulating driving signals +V(t) and −V(t), respectively, and the pair of the optical waveguide arms of the electro-optic MZM are driven in a push-pull manner.

FIG. 8 illustrates an example electro-optic MZM 800 having four TW drive electrodes 725, with a different pair of the TW drive electrodes 725 extending along opposite sides of each hybrid optical waveguide core segments 535 for differentially modulating light propagating therein. Ground electrodes 721 may be provided alongside the TW drive electrodes 725 at the side thereof opposite to the corresponding hybrid optical waveguide core segment 535. An electrical driver or drivers 760 may be connected to provide corresponding differential drive signals to each pair of the TW drive electrodes 725, so that the optical waveguide arms of the MZM are driven in a push-pull manner. This configuration of the drive electrodes, which may be referred to as GSSGSSG, has an advantage of lowering the Vπ voltage to each TW drive electrode, e.g., by about a factor of 2 comparing to the GSG arrangement of FIGS. 6A and 6B. This may also enable increasing the optical modulation swing for a similar or smaller drive voltage, reducing requirements on the amplitude of the modulation voltage, reducing the length of the electro-optical modulator, or some combination of the advantages.

In each of the MZMs 500, 600, 700, and 800, the optical guiding ribs 530 may contain silicon. In some embodiments, they may be formed of crystalline or polycrystalline silicon, e.g. by patterning a second or higher silicon layer of a SOI chip. In some embodiments, they may be formed of amorphous silicon. In some embodiments, they may be formed of another optical material having a greater refractive index than the surrounding material, for example they may be formed of silicon nitride ($Si_3N_4$). Embodiments in which the optical guiding rib 530 of the hybrid waveguide 535 is a silicon rib may have significant advantages for coupling light from an input silicon waveguide into a hybrid silicon/LN waveguide, because the refractive index of silicon (n=3.45) is greater than the refractive index of LN (n=2.1).

The LN layer 555 in such embodiments may be relatively thick, e.g. in the range of 500 to 700 nm, e.g. 600 nm, and e.g., with an optical confinement factor in the LN layer 555 about or greater than 80%. Contrary to that, the refractive index of silicon nitride (n=1.99) is lower than that of LN, so it may be harder to couple light back into a silicon nitride layer of the hybrid optical waveguide from the LN layer 555 of uniform thickness; in such embodiments the LN layer 555 may be thinner, e.g. about 200 nm, resulting in a lower fraction of the optical mode power being confined within the LN layer 555, and a lower electro-optic modulation efficiency.

Figure 9:
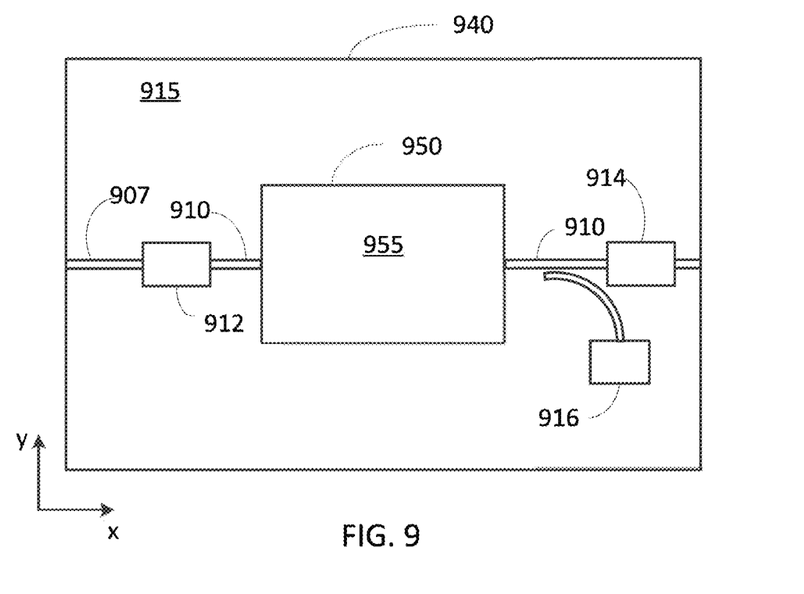
FIG. 9 is a schematic plan-view diagram of an optical device layer of a SiP chip for forming a hybrid electro-optical modulator with a TFLN chip, according to an example embodiment.

With reference to FIG. 9, example embodiments described above may be implemented using a SiP chip 940 having an optical device layer 915. The SiP chip 940 may be, for example, a SOI chip. The optical device layer 915, which is schematically illustrated in FIG. 9 in a plan view, may be, for example, a silicon layer, e.g. a first silicon layer of the SOI chip disposed directly over a BOX layer thereof (not shown). There may be other layers disposed over the optical device layer 915 (not shown), such as at least one cladding layer and one or more additional optical core layers. The one or more additional optical core layers include a top core layer (not shown) wherein optical guiding ribs 230, 430, or 530 described above may be located. A TFLN chip 950 may be flip-chip mounted upon and bonded to the SiP chip 940, with an LN layer 955 facing the optical guiding ribs defined in the top layer of the SiP chip 940, to form hybrid optical waveguide cores of an electro-optical modulator, e.g. hybrid optical waveguide cores 135 or 535 described above. The optical device layer 915 may comprise rib waveguide core segments 910, which may be optically coupled to the hybrid optical waveguide cores, providing optical input and output thereto. Rib waveguide core segments 910 may be embodiments of the rib waveguide cores 110 or the optical waveguide cores 505, 506 described above. The optical device layer 915 may implement a photonic integrated circuit, which may include one or more optical elements and devices schematically represented in FIG. 9 at 907, 912, 914, and 916, or at least optical cores thereof. By way of example, optical device 916 may be a photodetector (PD), e.g. formed in a germanium-deposited portion of the core layer 915 or as a germanium PD integrated to or into the SiP chip 940. Such optical devices may include, without limitations, input and/or output waveguides, edge optical couplers, vertical couplers, directional couplers, MMI couplers, polarization splitters, polarization rotators, polarization combiners, photodetectors, optical phase shifters, variable optical attenuators, etc. Thus, SiP chip 940 may be used to implement a photonic integrated circuit in one layer, and an electro-optical modulator in another layer or layers of a hybrid optical device.

Various ones of the above-described apparatus of FIGS. 1A-1B, 3A-3B, 6A-6B, 7, 8, and/or 9 may also include optical and electro-optical devices or an optical transmitter and/or an optical receiver integrated to or bonded to the same SiP substrate. For example, the same SiP substrate may include the optical front end and balanced-pair photodiode detectors of a coherent optical receiver, a laser flip chip bonded to or integrated in the SiP substrate, and/or passive optical devices such as polarization splitter(s) bonded to or integrated with the SiP substrate. Such embodiments may include analog and digital devices of such optical transmitter and optical receiver flip-chip bonded to the same SiP substrate and or mounted on another substrate along with the SiP substrate for optical devices of such an optical transmitter and optical receiver.

The examples of electro-optical modulators with planar hybrid optical waveguide cores comprising LN described above are not intended to be limiting, and many variations will become apparent to a skilled reader having the benefit of the present disclosure. For example, various features described above with reference to a specific embodiment or embodiments may be combined with other embodiments.

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

We claim:

1. An apparatus, comprising:
   a silicon substrate;
   a lithium niobate (LN) layer;
   a planar electro-optic Mach-Zehnder modulator extending along a main surface of the silicon substrate and comprising two optical waveguide arms connected to receive light in parallel from an optical splitter, and two pairs of traveling wave (TW) drive electrodes, each pair of TW drive electrodes disposed to modulate light in a respective one of the two optical waveguide arms;
   an electrical driver connected to provide differential drive signals to the two pairs of TW drive electrodes such that the two optical waveguide arms are driven in a push-pull manner, the electrical driver having differential outputs connected to the at least two TW drive electrodes; and
   wherein each of the two optical waveguide arms comprises a hybrid optical core segment located adjacent to a corresponding pair of the two pairs of TW drive electrodes, each hybrid optical core segment comprising a portion of the LN layer and an optical guiding rib located adjacent to and along the portion of the LN layer, each optical guiding rib being a silicon rib integral with the silicon substrate, wherein the LN layer has a thickness in a range from 400 nm to 800 nm.

2. The apparatus of claim 1, wherein the electrical driver has two pairs of differential outputs, each pair of differential outputs being electrically connected to a corresponding pair of the two pairs of TW drive electrodes.

3. The apparatus of claim 2, further comprising one or more optical devices disposed in a layer between the silicon substrate and the optical guiding ribs.

4. The apparatus of claim 1, wherein the LN layer extends over the two pairs of TW drive electrodes.

5. The apparatus of claim 1, wherein the two pairs of TW drive electrodes are between the LN layer and the substrate.

6. The apparatus of claim 5, further comprising a plurality of vertically stacked silicon layers disposed between the silicon substrate and the LN layer.

7. The apparatus of claim 1, further comprising:
one or more planar optical waveguides extending along the main surface of the silicon substrate at a different distance therefrom than the optical guiding ribs; and
at least one vertical coupler for optically coupling the one or more planar optical waveguides and the optical guiding ribs.

8. The apparatus of claim 1, further comprising one or more optical devices disposed in a layer between the silicon substrate and the optical guiding ribs.

9. The apparatus of claim 1, further comprising a silicon nitride layer disposed between two silicon layers.

10. The apparatus of claim 1 comprising a silicon layer disposed between the silicon substrate and the two pairs of TW drive electrodes.

11. The apparatus of claim 1, wherein the LN layer has a thickness in a range from 500 nm to 700 nm.

* * * * *